United States Patent [19]
Iida et al.

[11] Patent Number: 5,356,220
[45] Date of Patent: Oct. 18, 1994

[54] METHOD AND APPARATUS FOR MONITORING TEMPERATURE OF BLAST FURNACE AND TEMPERATURE CONTROL SYSTEM USING TEMPERATURE MONITORING APPARATUS

[75] Inventors: Osamu Iida; Toshihiko Hironaga, both of Kurashiki; Katsuhiko Yanagisawa, Chiba, all of Japan

[73] Assignee: Kawasaki Steel Corporation, Hyogo, Japan

[21] Appl. No.: 63,035

[22] Filed: May 18, 1993

[30] Foreign Application Priority Data

May 29, 1992 [JP] Japan .................................. 4-139061
Jun. 23, 1992 [JP] Japan .................................. 4-164874

[51] Int. Cl.⁵ ......................... G01N 21/65; G01J 5/10
[52] U.S. Cl. ................................. 374/161; 374/124; 374/131
[58] Field of Search ............. 374/116, 123, 124, 131, 374/137, 159, 161; 356/301; 250/227.14

[56] References Cited

U.S. PATENT DOCUMENTS

| | | | |
|---|---|---|---|
| 4,508,461 | 4/1985 | Lambert | 374/161 |
| 4,878,226 | 10/1989 | McQuoid et al. | 374/124 X |
| 5,028,146 | 7/1991 | Wada | 374/131 |
| 5,178,465 | 1/1993 | Amano et al. | 374/131 |
| 5,217,306 | 6/1993 | Wada | 374/131 X |

FOREIGN PATENT DOCUMENTS

| | | |
|---|---|---|
| 32999/93 | 2/1993 | Australia . |
| 33804/93 | 9/1993 | Australia . |
| 4019980A1 | 1/1991 | Fed. Rep. of Germany . |
| 4-074813 | 3/1992 | Japan . |
| 2140554A | 11/1984 | United Kingdom . |
| 2181830A | 4/1987 | United Kingdom . |
| 2190186A | 11/1987 | United Kingdom . |
| 2234346A | 1/1991 | United Kingdom . |

OTHER PUBLICATIONS

"Raman Scattering Light Utilized Distribution Type Temperature Sensor" Sensor Technology, vol. 9, No. 7, May 1989.

"Fibre Loop Thermometry", *Electronics & Wireless World*, vol. 95, No. 1636, Feb. 1989, Surrey, Great Britain, pp. 170–172.

C. R. Batchellor, et al., "Some Recent Advances in Fibre–optic Sensors", *Electronics & Communication Engineering Journal*, vol. 2, No. 5, Oct. 1990, London, Great Britain, pp. 175–184.

*Primary Examiner*—William A. Cuchlinski, Jr.
*Assistant Examiner*—G. Bradley Bennett
*Attorney, Agent, or Firm*—Oliff & Berridge

[57] ABSTRACT

An optical fiber is laid in a spiral shape on a surface of an iron skin of a hot-air oven constituting a blast furnace facility, and one end of the optical fiber is connected to a temperature measuring apparatus. A temperature distribution of an optical fiber laid area is measured based on the intensity of Raman back scattering light of a light pulse transmitted into the optical fiber and based on a time interval until the Raman back scattering light returns to the transmission end of the optical fiber. The temperature distribution is displayed on a display screen to monitor the temperature distribution of the whole area of the iron skin of the hot-air oven to detect an abnormal condition thereof.

11 Claims, 9 Drawing Sheets

TEMPERATURE DISPLAY

| A : T 01021 | B : T 02333 | C : T 02111 | D : T 01111 | E : T 04212 |
|---|---|---|---|---|
| 280 | 219 | 199 | 299 | 233 °C |

METHOD AND APPARATUS FOR MONITORING TEMPERATURE OF BLAST FURNACE AND TEMPERATURE CONTROL SYSTEM USING TEMPERATURE MONITORING APPARATUS

BACKGROUND OF THE INVENTION

1. Field of the Invention

The present invention relates to a method and apparatus for monitoring temperature by continuously detecting a temperature distribution on an iron skin surface of a blast furnace facility such as a blast furnace body and a hot-air oven to achieve security of the facility, and relates to a temperature control system using the temperature monitor apparatus.

2. Description of the Prior Art

In the hot-air oven for heating air to be supplied into a blast furnace which constitutes the blast furnace facility, the combustion of gas and the blast of high-pressure air are alternately repeated in the inside of the hot-air oven. For this reason, as shown in FIG. 2, an inner wall of the hot-air oven is covered by heat-resistant bricks R, and the outer surface is covered by an iron skin 1 made of iron. Here, in particular, since the iron skin is an important structural member to cover the whole of the hot-iron oven, it is designed to have sufficient strength to resist high temperature and high pressure.

However, during the operation of the hot-air oven, when a part of the heat-resistant bricks on the inner wall is damaged or falls off due to thermal fatigue or the like, the iron skin of this area will be exposed to high temperature air in the oven. In this case, there is a fear that the portion of the iron skin corresponding to the exposure will be red heated, and in the worst case, a crack is will be caused and the hot air in the oven will blow out to the outside.

In order to prevent such an abnormal situation beforehand, in the prior art method disclosed, for example, in Japanese Utility Model Laid-Open Publication No. 60-29248, thermometers are mounted on the surface of the iron skin, and the monitor is carried out by a method of predicting an abnormal situation of this kind from a change in temperature. Specifically, temperature sensors such as thermocouples are mounted on suitable positions of the surface of the iron skin to enable to find out a temperature rise due to the occurrence of red heat at an early stage.

However, in the prior art monitor method using the thermocouples involves a drawback in that the temperature is measured only at the "points" at which the thermocouples are mounted. If the whole surface of the iron skin constituting the outer wall of the hot-air oven is to be monitored by the prior art method using the thermocouples, several thousands of thermocouples must be mounted over the outer wall, and the practical use has never been achieved in view of the cost and workability.

For this reason, in the prior art monitor method, only the temperature has been monitored by disposing the thermocouples on the iron skin at essential points of several points to at most several tens of points. However, it is far insufficient to monitor the whole of the hot-air oven when the number of measurement points is in the above-mentioned order, and even when the object of the monitor is limited to a weld line at which the possibility of occurrence of crack is relatively high, it is impossible to cover the whole area, and thus it is not sufficient as the monitor method.

Furthermore, as to the blast furnace body, since the abnormal temperature on an outer surface reduces the life of the iron skin provided on the outer surface of the blast furnace facility, it is necessary to monitor the temperature of the iron skin also for the purpose of protecting the iron skin itself.

Accordingly, in the prior art, in order to monitor the temperature of the iron skin surface of the blast furnace body, a great number of high-temperature thermometers such as thermocouples are mounted on the whole surface of the iron skin of the blast furnace body.

Furthermore, Japanese Patent Publication No. 57-31073 discloses an apparatus for detecting positions at which the temperature is abnormally high by disposing a plurality of movable trucks about a blast furnace, and by measuring the temperature of the iron skin surface while moving the trucks each truck mounted with a radiation thermometer.

However, in the prior art method of measuring the temperature by mounting the high-temperature thermometers such as thermocouples on the iron skin surface, since a great number of thermocouples are needed, an enormous amount of installation cost is required, and many hours and manpower are required for inspection and maintenance. Regardless of such hours and manpower, the accuracy of finding the positions of occurrence of abnormally high temperature was not satisfactory.

Furthermore, in the monitor apparatus of iron skin surface disclosed in the above-mentioned Japaneses Patent Publication No. 57-31073, it is necessary to install around the blast furnace body a running gear of the trucks on which monitor units are mounted. However, it is difficult to install the running gear around the blast furnace in view of the available space since cooling water piping, a variety of gas pipings, cables, and iron frames are intricated around the blast furnace. Moreover, the cost of facilities for the running gear of the trucks and position detecting devices is expensive, and since the facility is complicated, many hours and manpower are required-for inspection and maintenance. In addition, an unsolved problem is involved in which the operation of the running gear of the trucks is difficult because the space around the blast furnace body is at high temperature, high humidity and high dust, and in an environment of CO gas.

SUMMARY OF THE INVENTION

The present invention was made in view of the unsolved problems in the prior art, and it is an object to provide a temperature monitor method, a temperature monitor apparatus, and a temperature control system using the temperature monitor apparatus.

In order to achieve the object, in a first aspect of the invention, an optical fiber is laid on a surface of an iron skin of a blast furnace facility, and a temperature distribution in an area in which the optical fiber is laid is measured from a time interval from transmission of a light pulse into the optical fiber until Raman back scattering light returns and from the intensity of the Raman back scattering light.

In a second aspect of the invention, the blast furnace facility includes a blast furnace body and a hot-air oven.

In a third aspect of the invention, a temperature monitor apparatus for performing temperature monitor of the blast furnace facility includes an optical fiber disposed on a surface of an iron skin of the blast furnace facility, and temperature measuring means connected to one end of the optical fiber for measuring a temperature distribution based on the intensity of Raman back scattering light and a time interval until the Raman back scattering light returns when the light pulse is transmitted into the optical fiber.

In a fourth aspect of the invention, the optical fiber is disposed on the surface of the iron skin in a spiral shape.

In a fifth aspect of the invention, the optical fiber has a reserved portion of a predetermined length at a midway position of the spiral optical fiber so that the reserved portion is not in contact with the surface of the iron skin but it is spaced therefrom.

In a sixth aspect of the invention, a temperature monitor apparatus for performing temperature monitor of the blast furnace facility includes an optical fiber disposed on a surface of an iron skin of the blast furnace facility, temperature measuring means connected to one end of the optical fiber for measuring a temperature distribution from the intensity of Raman back scattering light and a time interval until the Raman back scattering light returns when the light pulse is transmitted into the optical fiber, sprinkling control means for judging whether or not a temperature distribution value from the temperature measuring means exceeds a preset temperature and for opening a sprinkling valve at a high temperature position when it is judged that the temperature distribution value exceeds the preset temperature, and sprinkling means for sprinkling water on the surface of the iron skin under control of the sprinkling control means.

In the present invention, the optical fiber is laid, in particular, along a weld line over substantially the whole area of the surface of the iron skin of the blast furnace facility of the blast furnace body and the hot-air oven or the like. The optical fiber may be laid with a single optical fiber in a spiral shape, or a plurality of fibers may be laid dispersed so that each optical fiber may be changed over by an optical switch. A light pulse is transmitted into the optical fiber from a signal input end, and the Raman back scattering light is detected.

A temperature is detected from the intensity (the intensity ratio between a stokes' line and an anti-stokes' line) of Raman scattering light, and a measured position (or a segment) is detected from a time interval from transmission of the light pulse until the Raman scattering light returns thereby to measure a temperature distribution on the surface of the iron skin based on the intensity and the measured position. The obtained temperature distribution on the surface of the iron skin is graphically displayed on a CRT screen so that a temperature pattern and an actual temperature can be simply visualized with the densities and colors.

The temperature distribution is always monitored to find out an abnormal temperature rise at an early stage so as to prevent in advance the occurrence of a trouble caused by red heat or crack.

Furthermore, by providing the reserved portion of the optical fiber, it is possible to remove or separate a portion of the optical fiber from the surface of the iron skin temporarily at the time of maintenance work.

Moreover, the sprinkling control means judges whether or not there is an abnormally high temperature portion on the surface of the iron skin on the basis of the measured temperature distribution, and the sprinkling means is controlled to sprinkle water at the abnormally high temperature portion to lower the temperature thereof.

DESCRIPTION OF THE PREFERRED EMBODIMENTS

A first embodiment of the invention wherein the present invention is applied to a hot-air oven will be described with reference to the drawings.

The temperature monitor in the present invention is based on the temperature distribution measured by a temperature measuring apparatus using an optical fiber. Accordingly, first, the temperature measuring apparatus using the optical fiber will be described.

Figure 7:
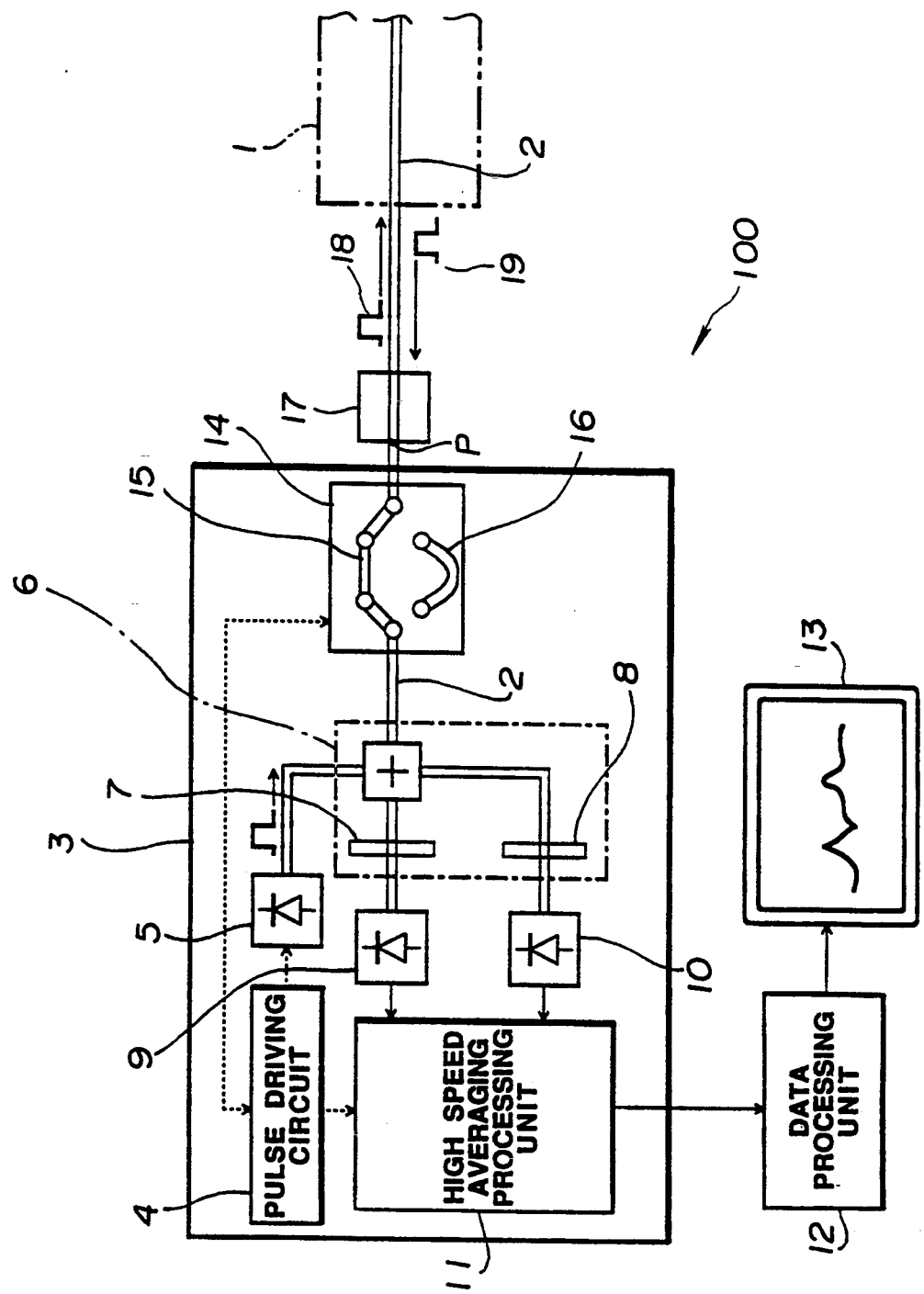
FIG. 7 is a block diagram of an apparatus for measuring a temperature by use of the optical fiber.

Referring to FIG. 7, the temperature measuring apparatus 100 includes similar to a prior art apparatus, a measuring section 3 which contains a pulse driving circuit 4 serving as light pulse oscillating means, and a pulse semiconductor laser (hereinafter referred to as an LD) 5. A light pulse is transmitted into an optical fiber 2 through an optical branching filter 6. An optical switch 14 serving as selective changeover means is inserted near a base portion of the optical fiber 2, and the optical switch 14 is driven in synchronism with the LD 5 by the pulse driving circuit 4. The temperature measuring apparatus 100 is the same as the prior art apparatus with the exception of inclusion of the optical switch 14.

The optical switch 14 includes a pair of fiber length adjusting optical fibers 15 and 16 having lengths different from each other, for example, by a half (0.5 m) of a distance resolution which is equal to a pulse width (1 m in the present embodiment) of the light pulse 18, and when the optical switch 14 is driven, either one of the first length adjusting optical fibers, i.e. 15 or 16 is instantly connected to the optical fiber 2. Accordingly, in the apparatus of the embodiment, it can be said that two types of the optical fibers 2 (i.e. detection routes) having lengths different from each other by 0.5 m are provided. In the present embodiment, a shorter detection route is referred to as a first route, and a longer route is referred to as a second route.

On the other hand, in the vicinity of the measuring section 3, there is disposed with a constant temperature tank 17 for accommodating a part of the optical fiber 2, and the temperature of the optical fiber 2 is maintained constant in a predetermined segment (1 m in the present embodiment). The optical fiber 2 exiting from the constant temperature tank 17 is installed along an object 1 to be measured similar to the prior art apparatus.

Furthermore, two types of interference filters 7 and 8 built in the optical branching filter 6, first and second avalanche photodiodes (hereinafter referred to as APD) 9 and 10, and a high speed averaging processing unit 11 are also provided in the measuring section 3.

The optical fiber 2 is laid or installed along the object to be measured, here the iron skin, and the light pulse 18 is transmitted into the optical fiber 2, within the measuring section 3, from the pulse semiconductor 5 which is driven by the pulse driving circuit 4. Subsequently, Raman back scattering light 19 from each position along the optical fiber 2 is received in the measuring section 3, and a Stokes' line and an anti-Stokes' line which are two components of the Raman back scattering light are splitted or separated by two types of interference filters 7 and 8 in the optical branching filter 6, and the intensities of the splitted Stokes' line and anti-Stokes' line are respectively photoelectric converted by the first and second avalanche photodiodes (APDs) 9 and 10. Then, the intensities of these two components are A/D converted in the high speed averaging processing unit 11, and the A/D converted intensities are respectively stored in a memory at locations respectively corresponding to delay times. After all the Raman back scattering light 19 returns from the optical fiber 2, a light pulse 18 is again transmitted into the optical fiber 2, and the detection of the Raman back scattering light 19 is carried out, and the obtained intensities are stored by adding to the respective previously stored intensities in the locations of the memory.

After repeating these operations predetermined times (for example, several thousands of times), the intensity values stored in each of the locations of the memory are divided by the number of times of the repetition to obtain an average value. The purpose of the processing for averaging is to prevent a measurement error from being introduced because of the very weak Raman back scattering light. Thereafter, in the high speed processing unit 11, the intensity ratio is obtained for each of the positions on the basis of the average intensity values of the Stokes' line and the anti-Stokes' line, and the obtained intensity ratios are delivered to a data processing unit 12. In the data processing unit 12, temperature distribution information is obtained on the basis of the intensity ratio at each of the positions along the optical fiber 2. The temperature distribution information is displayed on a screen of a display 13. In this respect, in obtaining the temperature from the intensity ratio between the Stokes' line and the anti-Stokes' line, a map prepared beforehand by experiments and calculations is used.

The data processing unit 12, different from that in the prior art, calculates two temperature distribution measurement values which are displaced in phase from each other, on the basis of the intensity ratio between the Stokes' line and the anti-Stokes' line at each position along the first and second routes delivered from the measuring section 3, and further, based on the two temperature distribution measurement values respectively for the first and second routes, calculates a temperature distribution value consisting of a series of temperature values of respective subsegments, here each of the subsegments is equal to a half of the segment which corresponds to the pulse width.

In the present invention, the optical fiber 2 connected to the optical fiber temperature measuring apparatus 100 is laid on the surface of the iron skin 1, and the temperature distribution of the iron skin 1 is measured.

Figure 3:
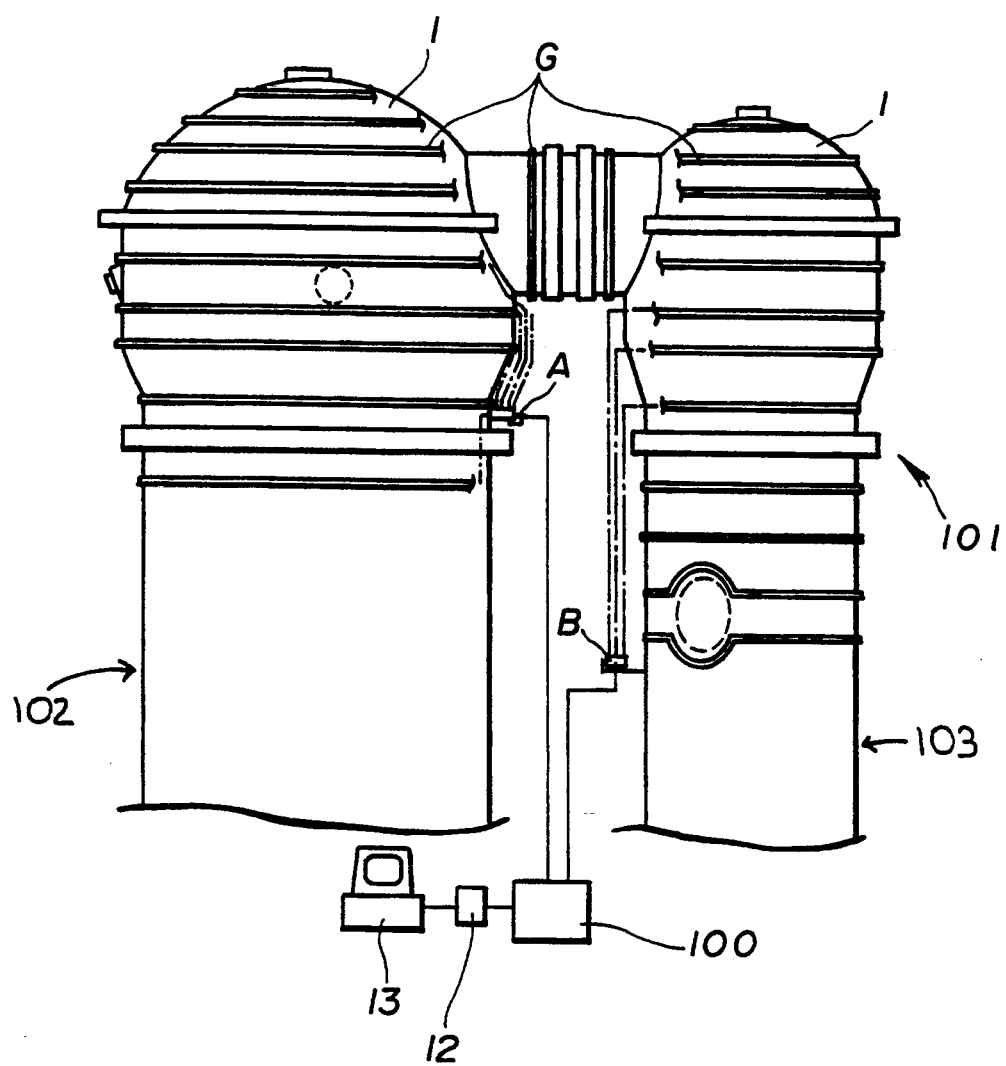
FIG. 3 is a schematic view showing a laying condition of an optical fiber on the surface of an iron skin.

As shown in FIG. 3, first, a plurality of guide pipes G are welded on the surface of the iron skin 1 of a hot-air oven 101 including a regenerator room 102 and a combustion room 103. The optical fiber 2 contained in a SUS tube is inserted into the guide pipes G (step S1 in FIG. 1). The guide pipes G are wound and laid at a fixed interval as shown in FIG. 3 so that the temperature monitor can be achieved over the whole area of the surface of the iron skin 1. The guide pipes G are laid, in particular, to entirely cover a weld line which is fragile and has a high possibility of causing a crack. In this case, a single long optical fiber may be inserted through all the guide pipes 8, or a plurality of optical fibers may be laid dispersed so as to enable to change over among a plurality of measuring routes by an optical switch.

However, since the length of the optical fiber which allows satisfactory measurement is limited by the property of a material constituting the fiber, normally, it is not desirable to measure with a single fiber over an area extending to 2 km or more. Furthermore, the laying work is easier when the fiber is shorter. For this reason, when it is necessary to monitor a wide area such as a hot-air oven, it is desirable to cover by a several optical fibers which can be changed over. The present embodiment also employs this system, and twenty optical fibers are periodically changed over by changeover means A and B. It is also required that the fiber is constituted by a material which is durable to a high temperature range of about 300° C.

Figure 1:
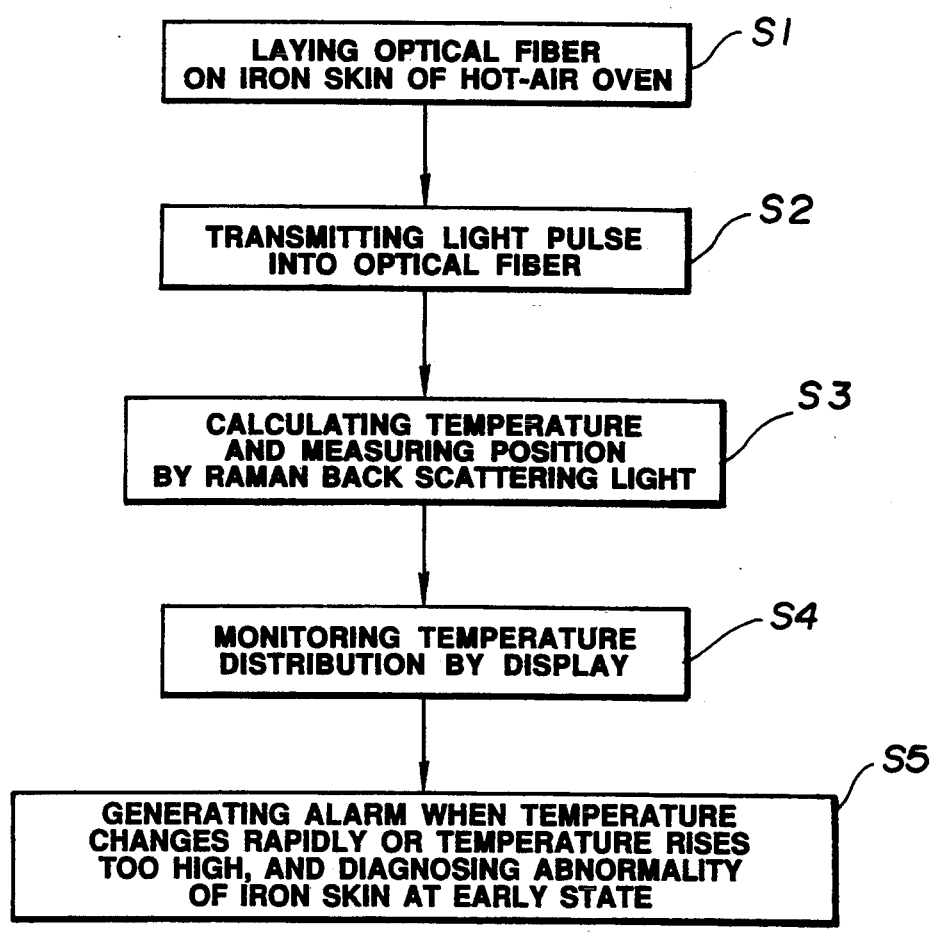
FIG. 1 is a flowchart showing a temperature monitor method of a hot-air oven in a first embodiment of the present invention.
Figure 2:
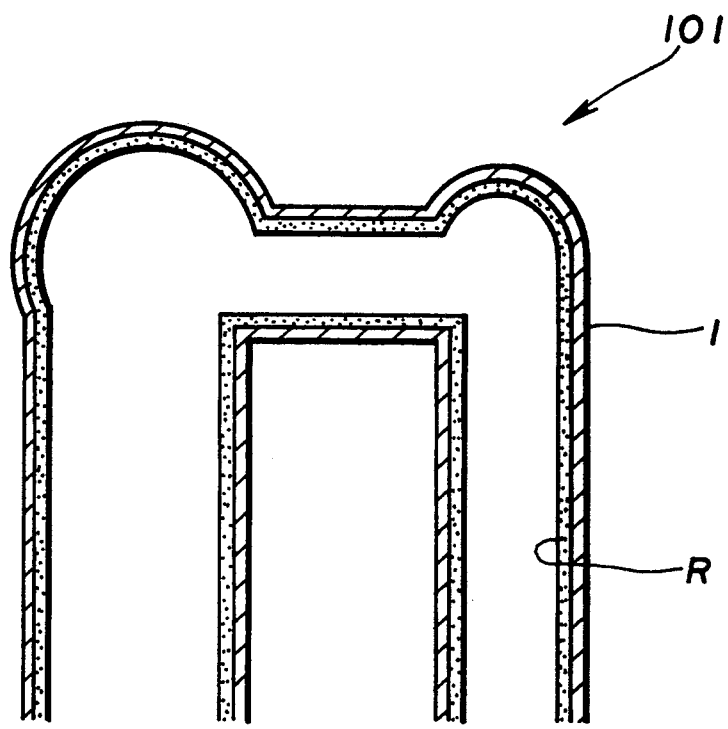
FIG. 2 is a cross sectional view of the inside of the hot-air oven.

After laying the optical fiber 2 in this manner, a laser light pulse is transmitted into the optical fiber 2 from one end thereof, and the Raman back scattering light is detected at the measuring section 3 of the temperature apparatus 100 using optical fiber (step S2 in FIG. 1).

In measuring the temperature distribution in this embodiment, first, the LD 5 and optical switch 14 are driven by the pulse driving circuit 4, and a light pulse is transmitted into one of a plurality of optical fibers laid over the surface of the iron skin by selecting the one by the changeover means A and B, and at the same time, the detection route is changed over between the first route and the second route.

For example, first, when the light pulse 18 is transmitted to the first rouge, a scattering is caused at each position along the optical fiber 2, and back scattering light returns to the transmitting end of the optical fiber 2. A Stokes' line and an anti-Stokes' line which are two components of the Raman back scattering light are splitted or separated by the two types of interference filters 7 and 8, and photoelectric converted respectively by the first and second APDs 9 and 10. Subsequently, in the high speed averaging unit 11, the intensities of the two components are A/D converted and stored in locations in a memory respectively corresponding to delay times. After all the back scattering light from the first route is returned, a light pulse is transmitted to the second route, and in a similar procedure, the intensities of the two components are stored by adding to the previous respective intensities in the memory in the high speed averaging processing unit 11. After repeating the above-mentioned operation for a multiplicity of times, the intensities are divided by the number of times of the repeated operations to perform averaging processing for each of the first and second routes.

Figure 8:
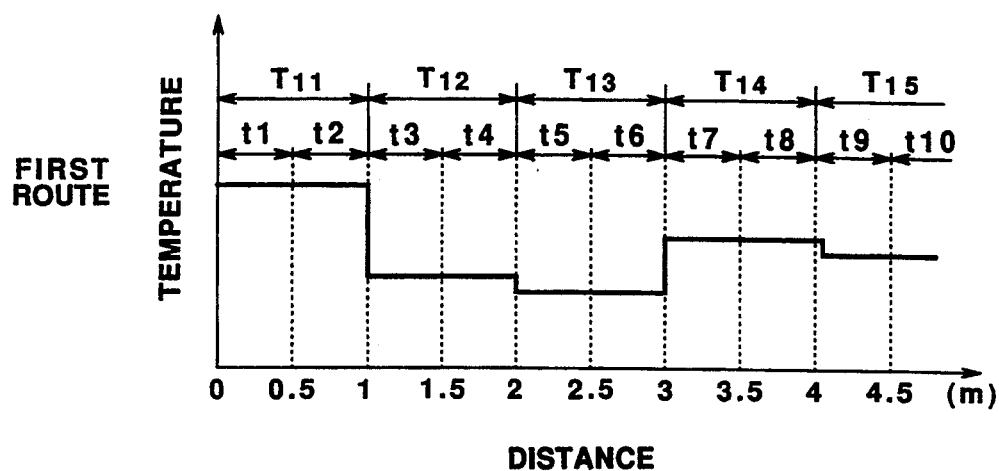
FIG. 8 shows an example of measurement of a temperature distribution through a first route in the apparatus of FIG. 7.
Figure 9:
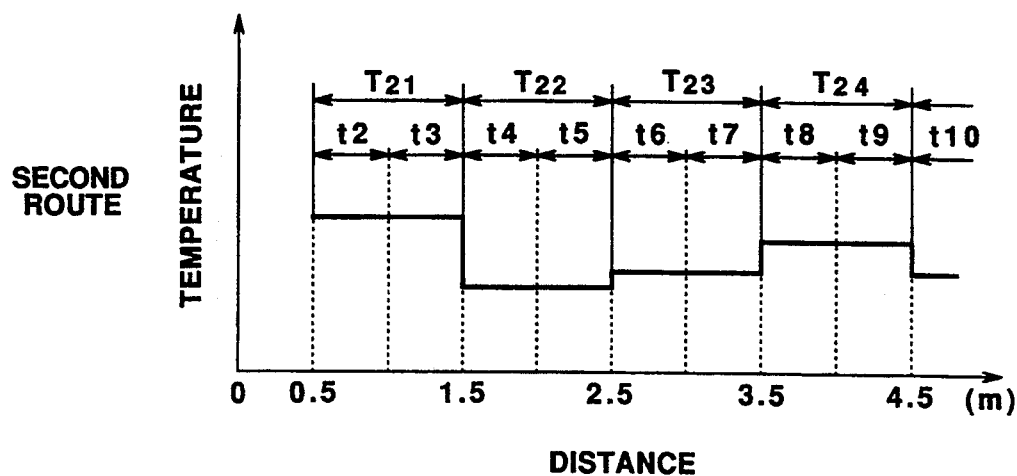
FIG. 9 shows an example of measurement of the temperature distribution through a second route in the apparatus of FIG. 7.

Thereafter, in the data processing unit 12, two temperature distribution measurement values respectively for the first and second routes as shown in FIGS. 8 and 9 are produced based on the intensity ratio between the Stokes'line and the anti-Stokes'line at each position delivered from the measuring section 3. The two temperature distribution measurement values are phase (a distance corresponding to a delay time) displaced by 0.5 m due to the difference in route lengths, and by comparing the two measurement values, the temperature measurement point can be determined with high accuracy.

Figure 10:
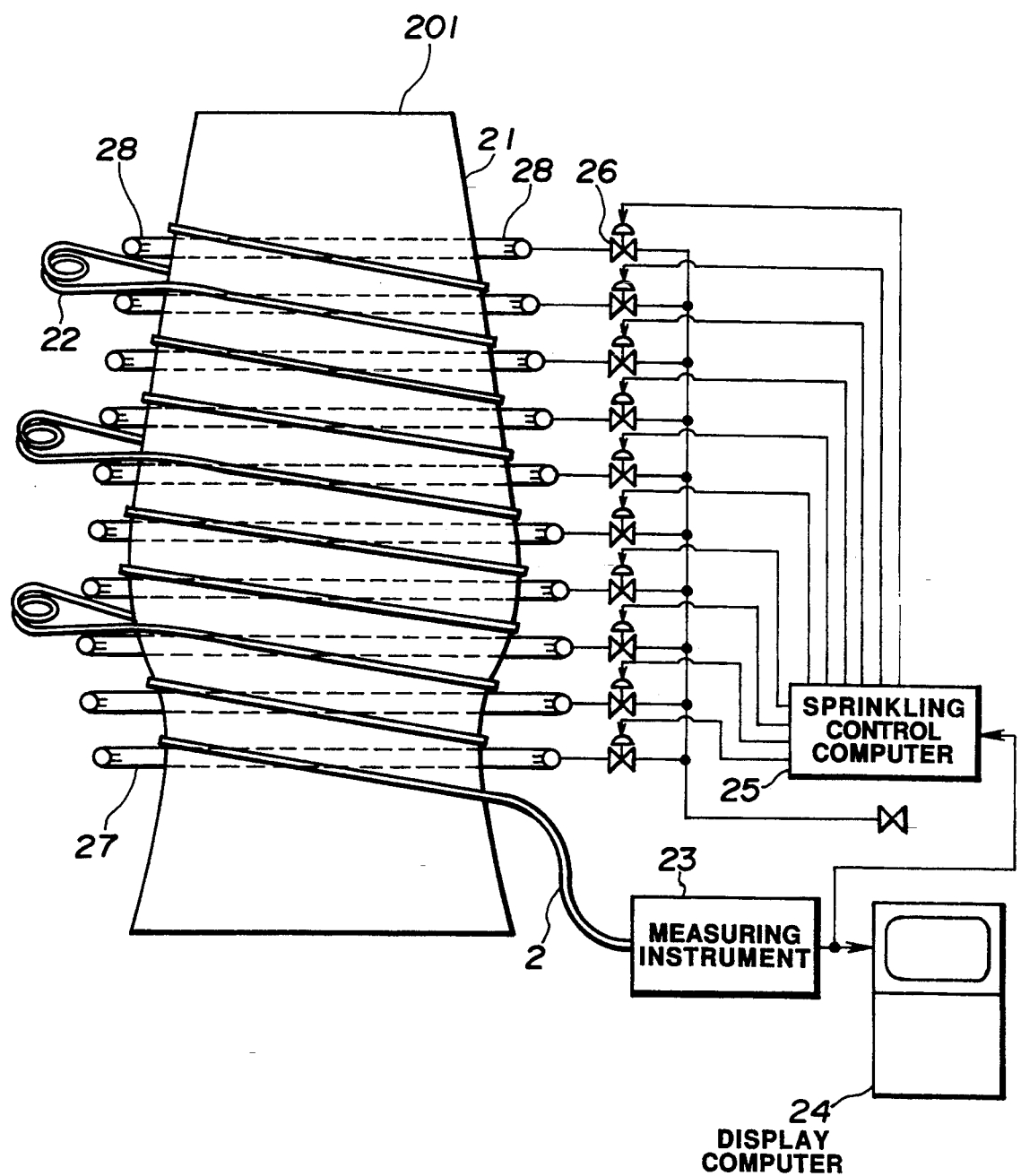
FIG. 10 is a schematic diagram showing a temperature monitor apparatus of a blast furnace body in a second embodiment of the present invention, and showing a temperature control system using the temperature monitor apparatus.

The measurement starting point in FIGS. 8 and 9, that is, a reference point "0" in the distance is selected at an entrance of the constant temperature tank 17, a point P in FIG. 10. In this case, the determination of the measurement starting point is made by calculating a delay time of the back scattering light based on a velocity L of the light pulse in the optical fiber 2 and a distance between the LD 5 and the constant temperature tank 17. Furthermore, the characters $T_{11}, T_{12}, T_{13}, \ldots$ in FIG. 8 represent segment average temperatures of a series of segments in the first route, each of the segments corresponding to 1 m, and the characters $T_{21}, T_{22}, T_{23}, \ldots$ in FIG. 9 represent segment average temperatures of a series of segments in the second route, each of the segments corresponding to 1 m. The characters t1, t2, t3, ... in FIGS. 8 and 9 represent subsegment average temperatures of a series of subsegments in the first and second routes, each of the subsegments corresponding to 0.5 m or a half of the segment, however, at this stage, these subsegment average temperature have not yet been known.

Subsequently, in the data processing unit 12, the subsegment average temperature of each subsegment of 0.5 m is calculated on the basis of the two temperature distribution measurement values each consisting of the series of segment average temperature of 1 m segments. Firstly, a first and a second subsegment average temperature t1 and t2 are calculated. In the first route, since the segment of 0 to 1 m is within the constant temperature tank 17 as described in the foregoing, the temperature is maintained at the constant value. Accordingly, both the subsegment temperatures t1 and t2 are equal to the segment average temperature $T_{11}$, and thus, $t1=t2=T_{11}$.

Next, in the data processing unit 12, the subsegment average temperature t3 is calculated. In the second route, since the segment average temperature $T_{21}$ of the segment of 0.5 to 1.5 m is an average value of the subsegment average temperatures t2 and t3, $T_{21}=(t2+t3)/2$, and thus, $t3=2 T_{21}-t2$. Here, since $t2=T_{11}$, it is obtained that $t3=2 T_{21}-T_{11}$. Furthermore, in a similar procedure, the subsegment average temperature $T_{12}$ of the segment of 1 to 2 m in the first route and subsegment average temperature t3. In other words, $T_{12}=(t3+t4)/2$, and thus, $t4=2 T_{12}-t3=2 T_{12}-2 T_{21}+T_{11}$.

Likewise, after obtaining the subsegment average temperatures t5, and so on, subsequently, the data processing unit 12 forms temperature distribution information from these subsegment average temperature t1, t2, t3, ..., and this temperature distribution information is displayed on a screen of the display 13.

In this manner, after a temperature of each measurement point of one optical fiber 2 has been measured, the previous optical fiber 2 is changed over to the next optical fiber 2 by the changeover means A and B, and a temperature and a position are determined by a similar procedure. Thus, a temperature pattern of the whole iron skin can be produced.

Figure 4A:
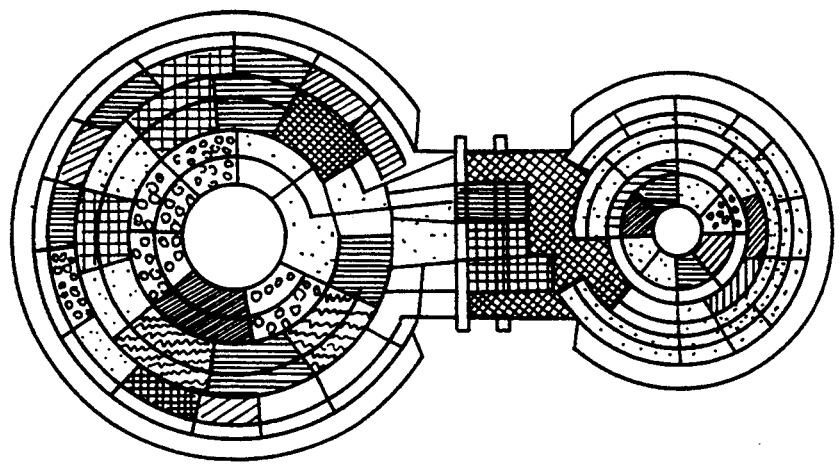
FIG. 4(a) shows an example of a display on a display screen of temperature distribution shown from a top view.
Figure 4B:
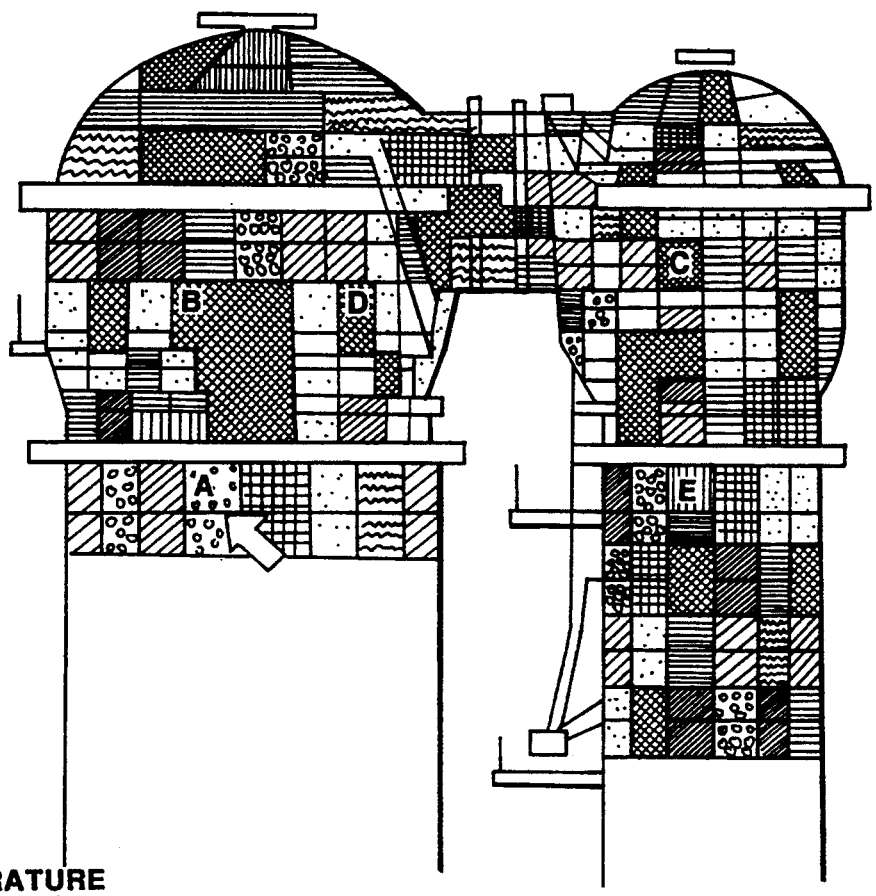
FIG. 4(b) shows an example of a display on a display screen of a temperature distribution shown from a side view.
Figure 5A:
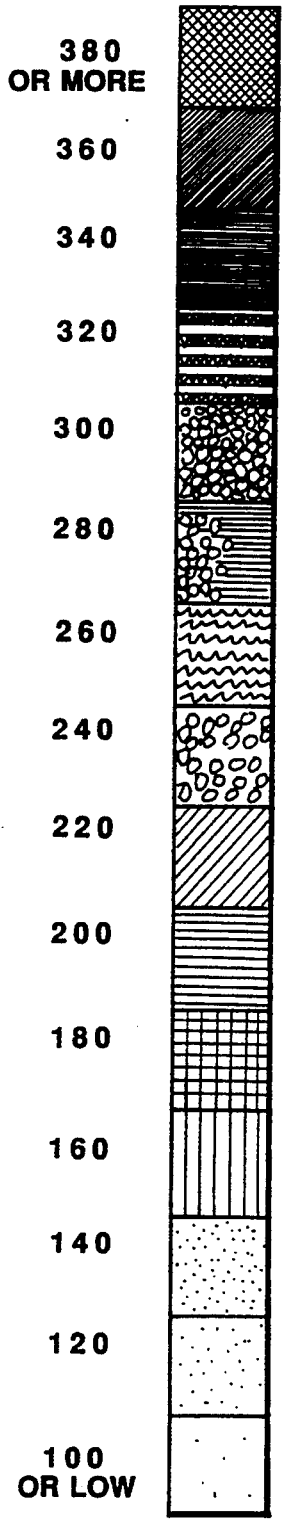
FIG. 5(a) shows temperature ranges on the display screen.
Figure 5B:
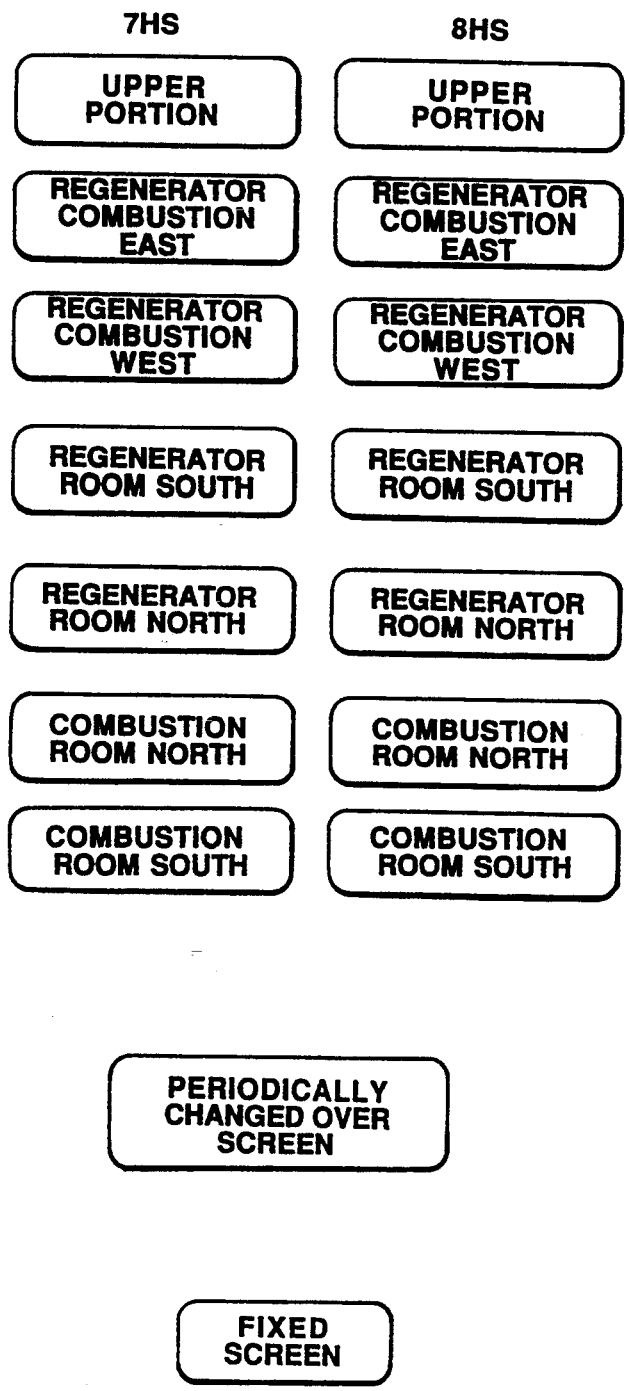
FIG. 5(b) shows observation directions on the display screen.

A temperature distribution of the surface of the iron skin is measured for each segment of 1 m (step S3), and the result is displayed on the display 13 through the data processing unit 12 for the purpose of monitor (step S4). This display is made graphically so as to enable the operator to understand easily. In other words, as shown in the example of display in FIG. 4, the surface of the iron skin of the hot-air oven is displayed by dividing into a great number of areas in a mosaic fashion (resolution of about 1 m), and the temperature of each mosaic area is displayed by changing the concentration depending on the degree of temperature. As a result, the temperature pattern can be understood at a glance. The temperature display is made by changing the concentration, for example, with a pitch of 20° of 380° C., 360° C., 340° C., ... 100° C., and so on as shown in FIG. 5. Furthermore, the history of temperature of each measurement point is maintained for a long time, and the changes of the temperature can be viewed as a trend graph.

Furthermore, it is possible to select a portion to be displayed and a direction of viewing the portion of the surface of the hot-air oven, for example, a desired portion and from what direction of east, west, south, or north the desired portion to be viewed can be selected. For this purpose, when any one of the selection columns shown in FIG. 5 is designated by a cursor on the display, a display screen observed from desired direction can be obtained in FIG. 4 (step 4).

Furthermore, when the temperature of the measured portion exceeds a predetermined upper limit, an alarm is generated, and the corresponding portion is displayed so that a diagnosis of the abnormal state can be effected at an early stage reliably (step 5).

Figure 6:
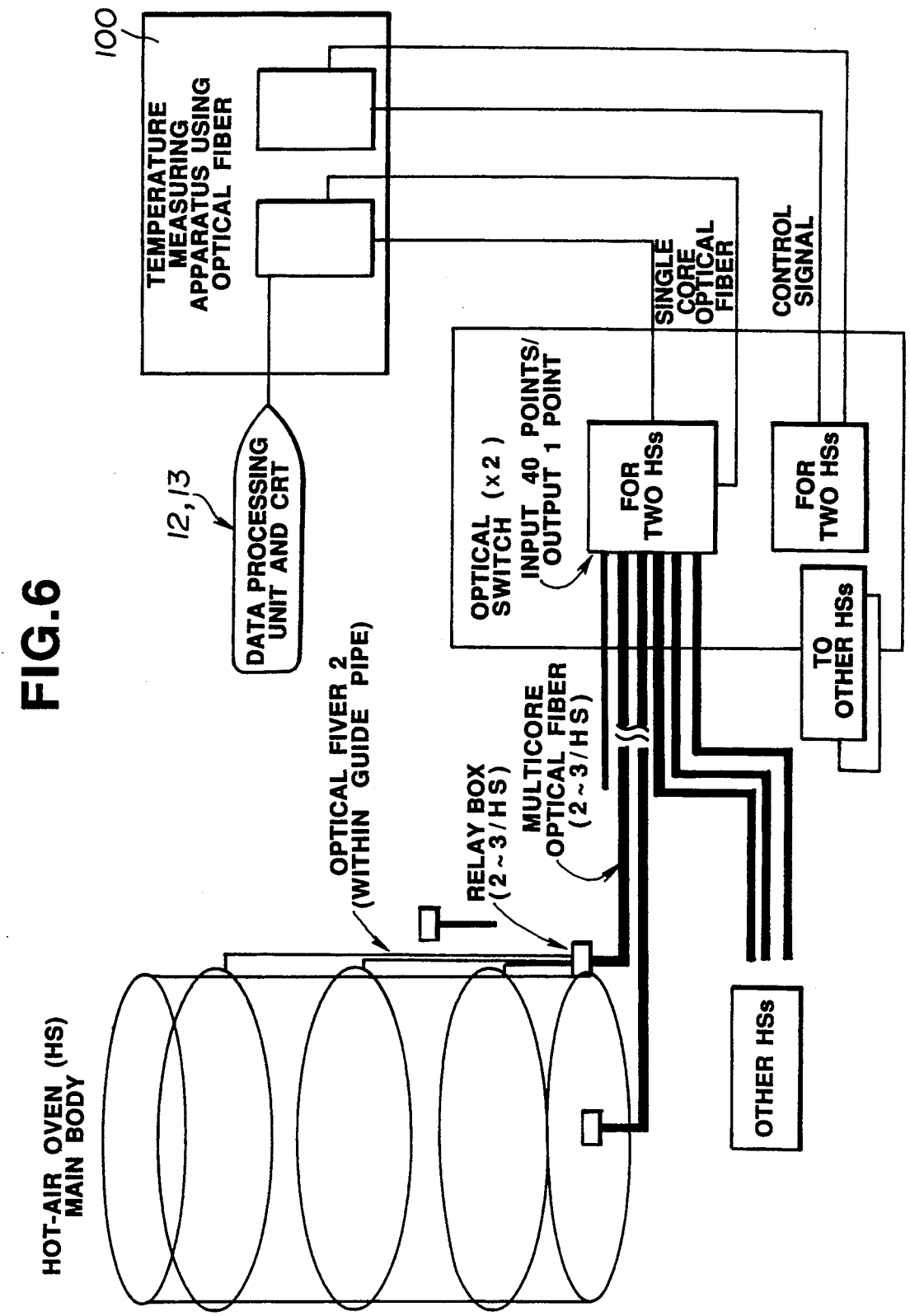
FIG. 6 is a schematic diagram showing the principle of a temperature monitor system by use of an optical fiber.

In this embodiment, one hot-air oven (HS) is the object of measurement, however, as shown in FIG. 6, optical fibers are laid on a plurality of hot-air ovens, and these hot-air ovens may be concentrically managed by one temperature measuring apparatus 100.

As described above, in the present embodiment, several thousands of measurement points can be monitored with one temperature measuring apparatus 100. Furthermore, since the display of the result of the measurement is easily understandable, it is possible to construct a monitor system which is suitable for the management of security.

In the monitor method of the hot-air oven in the first embodiment described above, since the optical fiber or fibers are laid on the surface of the iron skin of the hot-air oven, and the temperature distribution of the laying area of the optical fibers is measured from the time interval until the Raman back scattering light of the light pulse transmitted into each of the optical fibers returns to the transmitting end and from the intensity of the Raman back scattering light, the monitor of the whole iron skin of the hot-air oven can be achieved reliably.

In addition, since the result of measurement is displayed for monitor purpose in the form which is easily viewed and interpreted, the abnormality monitor system in this embodiment is very reliable, and a significant advantage is provided in which the safety of the hot-air oven facility and its associated various facilities is improved, and the operating efficiency of iron manufacturing installations is improved.

A second embodiment in which the present invention is applied to a blast furnace body will be described with reference to FIG. 10.

A blast furnace body 201 has an iron skin 21 which constitutes an outer peripheral surface member of the blast furnace body 201. An optical fiber 2 made of qualtz glass, multicomponent glass or the like is installed or laid on the surface of the iron skin 21, and the optical fiber 2 is wound around the surface of the iron skin 21 in contact therewith in a spiral shape with a fixed interval of 500 mm or less in a vertical direction. The optical fiber 2 has a surplus length portion 22 in a midway of the spiral for every two or three windings of the spiral so that the surplus length portion 22 is spaced from the iron skin surface radially and outwardly, thereby to enable to remove or separate the optical fiber 2 from the iron skin surface temporarily during maintenance work of the furnace body.

Furthermore, water sprinkling ring pipes 27 are provided horizontally on the outer peripheral surface of the iron skin 21 around which the optical fiber 2 is wound, and the number of steps of the water sprinkling ring pipes 27 is equal to the number of steps of the optical fiber 2, and the interval of the adjacent steps of the water sprinkling ring pipes 27 is also equal to that of the optical fiber 2. Each of the water sprinkling ring pipes 27 has a great number of water sprinkling or water spray nozzles 28 on an inner peripheral surface at positions facing the iron skin 21 so that water is sprayed onto the iron skin 21 from the water spray nozzles 28.

One end of the optical fiber 2 is connected to a measuring instrument 23 serving as temperature measuring means having the same arrangement as the temperature measuring apparatus 100 using optical fiber, and the measuring instrument 23 calculates a temperature and a position based on a measured value obtained through the optical fiber 2. The result of measurement is delivered to a display computer (CRT) 24 and a sprinkling control computer 25, and the display computer (CRT) 24 displays the result of the calculation. The sprinkling control computer 25 judges whether or not the calculated temperature exceeds a predetermined set temperature based on the result of the calculation, and when judged as exceeding the predetermined set temperature, an automatic water supply valve 26 corresponding to one of the water sprinkling ring pipes 27 disposed around an abnormally high temperature position is opened so that water is sprayed from the water spray nozzle 28 onto the abnormally high temperature position. The automatic water supply valve 26 is closed when the temperature of the abnormally high temperature position is lowered to stop the sprinkling of the water.

Next, the operation of the above embodiment will be described.

First, in the measurement instrument 23, similar to the first embodiment, an average temperature of each sub-segment of 0.5 m of the surface temperature of the iron skin 21 of the blast furnace body 201 is calculated, and surface temperature distribution information is further calculated to deliver this information to the display computer 24 and the sprinkling control computer 25. In the display computer 24, similar to the first embodiment, the temperature information is displayed with different colors for respective temperature ranges.

On the other hand, in the sprinkling control computer 25, as to the temperature distribution information from the measuring instrument 23, it is judged whether a predetermined set temperature is exceeded or not, and when exceeded, corresponding one (or ones) of the water sprinkling ring pipes 27 located at a high temperature position is selected based on position information of the temperature distribution information to open the automatic water supply valve 26 corresponding to the selected water sprinkling ring pipe 27. As a result, water is sprinkled or sprayed onto the high temperature position of the iron skin 21 so that the temperature of the iron skin surface is decreased due to the sprinkling. When it is judged in the sprinkling control computer 25 that the temperature of the position of the sprinkling is lowered from the set temperature based on the temperature distribution information from the data processing unit, the automatic water supply valve 26 is closed.

Accordingly, it is possible to measure the temperature distribution of the iron skin surface continuously by winding the optical fiber around the surface of the iron skin of the blast furnace and by obtaining the temperature distribution information. Furthermore, since the water is sprinkled when the measured temperature is higher than the set temperature, it is possible to perform consistently and automatically beginning with the monitor stage to the protection stage of the furnace body. Thus, the hours required for the maintenance and inspection work of the blast furnace body can be reduced, and the work under the severe and hard condition of high temperature and high dust can be reduced.

Furthermore, since the surplus length portion 22 is provided in the midway of the optical fiber 2 which is laid on the iron skin surface in a spiral shape, it is possible to temporarily separate or remove a desired portion of the optical fiber from the iron skin surface during maintenance of the blast furnace body, and thus, the work efficiency can be improved.

Moreover, since the temperature is detected by the optical fiber, it is possible to reduce the cost of the measuring facility, and in addition, since the deterioration is small, the manhour or labor hour required for the maintenance and management of the optical fiber can be reduced to a great extent.

In the second embodiment, although the optical fiber is laid on the iron skin surface in the spiral shape, the shape is not limited to this, and the optical fiber may be laid in the form of a plurality of rings.

Also, in the second embodiment, although the optical fiber is laid on the iron skin surface of the blast furnace in directly contact therewith, it is possible to lay a pipe made of stainless steel and to insert the optical fiber into the pipe.

Furthermore, in the second embodiment, although the water is sprinkled from the whole circular portion of the water sprinkling ring pipe which is laid around the abnormally high temperature position, the water sprinkling ring pipe may be divided into a plurality of parts each having a ¼ of one circumference, and the automatic water supply valve may be provided on each part so that the water is sprinkled onto only the vicinity of the abnormally high temperature position.

As described above, in the temperature monitor apparatus in the second embodiment and in the temperature control system using the temperature monitor apparatus, it is possible to continuously and completely measure the temperature distribution of the iron skin surface by laying the optical fiber on the iron skin surface of the blast furnace body in the spiral shape. Furthermore, since the water sprinkling is performed automatically when the measured temperature distribution information is higher than the set temperature, it is possible to sprinkle the water automatically onto the abnormally high temperature position of the iron skin, and to automatically maintain the temperature of the iron skin at the set temperature or lower. In addition, since the surplus length portion is provided for the optical fiber, it is possible to temporarily separate or remove a portion of the optical fiber from the surface of the iron skin during maintenance work of the blast furnace and the work efficiency can be improved.

What is claimed is:

1. An apparatus for monitoring a temperature of a blast furnace facility, the apparatus comprising:
    an optical fiber wound around and contacting an outside surface of said blast furnace facility;
    temperature measuring means connected to a transmission end of said optical fiber, for measuring a temperature distribution of a measuring area of the outside surface of the blast furnace facility, the measuring area comprising portions of the outside surface of the blast furnace facility contacting the optical fiber, the temperature measuring means measuring a temperature distribution based on an intensity of Raman back scattering light from a light pulse transmitted into the optical fiber and further based on a time interval from the transmission of the light pulse until the Raman back scattering light returns to the transmission end of the optical fiber; and
    display means for displaying the temperature distribution.

2. The apparatus of claim 1, wherein said optical fiber is laid on the outside surface of the blast furnace in a spiral shape.

3. The apparatus of claim 1, wherein said optical fiber has at least one surplus length portion, each surplus length portion being spaced away from the outside surface of the blast furnace facility.

4. The apparatus of claim 1, wherein said blast furnace facility is a blast furnace body.

5. The apparatus of claim 1, wherein said blast furnace facility is a hot-air oven.

6. The apparatus of claim 1, wherein the optical fiber is made of a high temperature resistant material.

7. The apparatus of claim 1, wherein a predetermined interval is spaced between each adjacent turn of said optical fiber.

8. The apparatus of claim 1, wherein the display means displays the temperature distribution of the outside surface of the blast furnace facility in a mosaic fashion, and the outside surface of the blast furnace facility is divided into a predetermined number of subareas.

9. The apparatus of claim 1, wherein the optical fiber comprises a fiber inserted into a tube, which is inserted into a guide pipe, wherein the guide pipe is wound around and welded to the outside surface of the blast furnace facility.

10. The apparatus of claim 1, wherein the outside surface of the blast furnace facility is a shell is substantially made of steel.

11. A temperature control system for a blast furnace facility comprising:
    an optical fiber wound around and contacting an outside surface of said blast furnace facility;
    temperature measuring means connected to a transmission end of said optical fiber for measuring a temperature distribution of a measuring area of the outside surface of the blast furnace facility, the measuring area comprising portions of the outside surface of the blast furnace facility contacting the optical fiber, the temperature measuring means measuring a temperature distribution based on an intensity of Raman back scattering light from a light pulse transmitted into the optical fiber and further based on a time interval from the transmission of the light pulse until the Raman back scattering light returns to the transmission end of the optical fiber;
    water sprinkling control means for judging when the temperature distribution exceeds a predetermined set temperature and for opening a water spray valve; and
    water sprinkling means for sprinkling water on the outside surface of the blast furnace facility, said water sprinkling control means controlling said water sprinkling means.

* * * * *